United States Patent Office 3,087,804
Patented Apr. 30, 1963

3,087,804
POLYMERIC N-VINYL-2-OXAZOLIDINONES AS PLANT GROWTH RETARDANTS
Wilhelm E. Walles and William F. Tousignant, Midland, Mich., assignors to The Dow Chemical Company, Midland, Mich., a corporation of Delaware
No Drawing. Filed Apr. 11, 1960, Ser. No. 21,127
4 Claims. (Cl. 71—2.5)

The present invention relates to modification of the growth characteristics of living plants and parts of plants and is especially directed to a new and improved method for delaying or inhibiting growth of living plant parts. In the present specification and claims the expression "living plant parts" is used to designate the parts which, collectively, make up plants or the separate parts, such as seeds, stems including such specialized stems as tubers, stolons, and rhizomes; buds, including such specialized buds as bulbs, and corms; roots including specialized roots wherein plants store up nutrients; and the like, or any of them. It is well known that in many species, the recurrence of a period of dormancy permits of various specialized uses such as dormant plant material in the reproduction and propagation of plants. For an examination of such specialized uses, see, for example, "Propagation of Horticultural Plants," by G. W. Adriance and F. R. Brison, McGraw-Hill, New York, 1955. In many uses of dormant plant materials it is desired to prolong the period of dormancy without harm to the plant materials, with the result that, upon termination of such prolonged dormancy, such plant material again grows normally.

It has now been discovered that, by the process of contacting a living plant part with a water-soluble polymer comprising recurring cyclic carbamate moieties containing from 5 to 7, inclusive, annular nuclear members, the growth of such material is delayed. When the plant part is dormant, the termination of dormancy and subsequent inception of active growth is delayed by the process of contacting the seed part with a water-soluble polymer comprising recurring cyclic carbamate moieties containing from 5 to 7, inclusive, annular members. Following the dormancy, the duration of which is prolonged according to the said process, the dormant plant materials resume normal growth. Moreover, when the said water-soluble polymer is removed from the said dormant plant part, as by washing with fresh water, the action of delaying normal growth is terminated. When no deliberate step is taken to remove said polymer from said plant part, in the presence of conditions normally favorable to growth, the said plant material after a period of time in some way overcomes the delaying action and begins growth which is normal in all respects except that it may initially be slow.

It is not known in what way the said cyclic carbamate materials operate to inhibit or delay plant growth or to prolong the dormancy of dormant plant parts. The action is not that of a herbicide. Application of said materials at dosages or rates many times as great as are required to prolong the dormancy of dormant plant parts, or to inhibit active growth, do not kill or appear to harm the plant parts to which such applications are made, and repeated observation indicates that after a period of inhibition of growth or delay of inception of growth the so-retarded plant parts then begin to grow normally and give no evidence of injury. Thus, the present invention is especially adapted to delay temporarily the growth of dormant plant materials.

It has also been observed that the growth-inhibiting action of the said polymers also retards or inhibits the growth of materials which are actively growing at the time contact with said polymer is made. The presence of said polymer in contact with actively growing parts of transplanted perennial plants, seedlings, young plants produced from the sprouting of tubers, roots rhizomes, bulbs, corms, and the like, or rotted cuttings, produced by the initiation of root growth on cuttings which were dormant at the time such initiation was instituted has a distinct growth-inhibiting effect upon such actively growing plant materials.

By contacting the said polymers with dormant plant materials, the dormancy of the said plant materials is prolonged for an extended period of time. By avoiding contact between the said polymers and other plant materials delay of the growth of which is not desired, such other plant materials are of course, left unaffected. In this way, the inception of growth of so treated and untreated dormant plant materials may be caused to take place at different times under conditions which are identical but for the differential presence of the said polymers.

It will at once be evident to those skilled in the arts of horticulture, agriculture, and the like that the judicious employment of the said polymer substances permits relatively flexible control of various aspects of plant growth such as the interval of time between planting and germination of seeds.

For example, dinitrophenols are widely used as pre-emergence herbicides in fields planted to large seeded crops, such as cotton, beans, peanuts, and corn. In present practice, the crop is planted and thereafter, before the seedling crop plants emerge through the soil, the soil surface is sprayed with a dinitrophenol preparation. This kills many kinds of weeds without injury to the subsequently emerging crop seedlings. However, in favorable weather, the time interval between planting and emergence of a crop may be so short that farmers are unable to apply the herbicide to all of the planted area which it is desired to treat.

The growth-inhibiting effect of the present invention may be employed usefully here. The seeds of the intended crop are first treated according to the present invention, are then planted, and the herbicide thereafter applied. The treatment according to the present invention substantially prolongs the interval between planting and emergence of the seed without injury to the crop. Weeds are thus killed, and normal growth of the crop ensues.

Specific materials to be employed in the practice of the present invention are water-soluble polymeric N-alkenyl cyclic carbamates whereof the carbamate ring comprises 5, 6, or 7 annular members and has, as substituents upon the non-carbonyl annular carbon atoms, hydrogen, loweralkyl, or hydroxyloweralkyl. The expression loweralkyl is used in the present specification and claims to refer to alkyl containing 1–6, inclusive, carbon atoms. It is not necessary that the said polymeric material be a homopolymer. Good results are obtained when employing a copolymeric material of which the monomeric precursors are N-alkenyl cyclic carbamate materials of more than one kind. Similarly, good results are obtained when employing copolymers of which one of the monomeric precursors is an N-alkenyl cyclic carbamate and another is any ethylenically unsaturated copolymerizable material. However, inasmuch as the cyclic carbamate moieties, when attached to the ethylenic polymer carbon chain "backbone," are believed to be the site of the activity necessary for useful results of the present invention, when copolymers are employed whereof only part of the recurring moieties in the resulting polymer contain the said cyclic carbamate constituents, the growth-delaying activity will be exhibited primarily by the said cyclic carbamate moieties and ordinarily not by the other portions of that polymer which are essentially inactive. However, the use of copolymers containing moieties which do not contribute to the growth-delaying action of the present invention, may be advantageous and desirable properties such as bulk, adhesiveness, fungicidal activity, and the like.

In particular, good results are obtained when employing one of the following substances: polymeric 5-methyl-3-vinyloxazolidin-2-one, polymeric 4-methyl-3-vinyloxazolidin-2-one, polymeric 3-vinyloxazolidin-2-one, and polymeric 3-vinyl-6-methyloxazinidin-2-one.

In general the monomeric precursors of the growth-delaying materials to be employed according to the present invention are readily prepared according to the following general scheme:

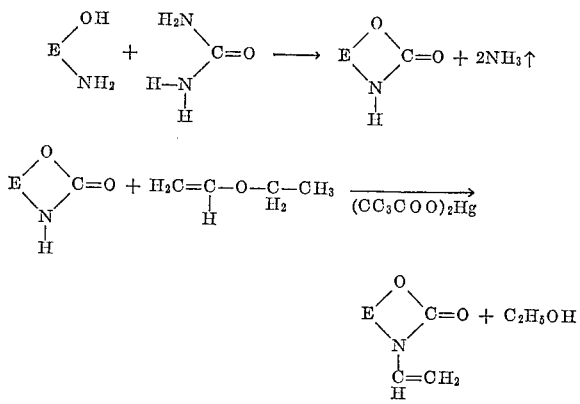

wherein E represents ethylene, or substituted ethylene wherein hydrogen is replaced by a lower alkyl or hydroxy-lower alkyl group.

By choice of alternate starting materials, wherein the hydroxyl and amino groups are on carbon atoms having another carbon intermediate, it is possible to carry out a reaction with urea to prepare oxazinidinones. Such starting materials are represented by the general formula:

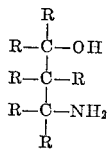

wherein R is hydrogen or a monovalent radical selected from loweralkyl and hydroxyloweralkyl. Similarly, when it is desired to produce an oxazepinanone, the starting aminoalkanol is chosen whereof the amino group and hydroxyl group appear on the carbon atoms with two other carbon atoms intermediate them, as are shown in the general formula:

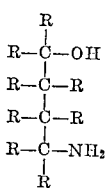

In the foregoing general formulas, the letter R is used to designate hydrogen, or a loweralkyl or hydroxyloweralkyl group. When the starting aminoalkanol compound is 4-amino-1,3-butanediol, the resulting compound is 5-hydroxyethyloxazolidin-2-one. When the starting compound is 2-amino-1,4-butanediol, the resulting compound is 4-hydroxyethyloxazolidin-2-one. Either of the said hydroxyethyl oxazolidinones may be dehydrated, as by heating gently in the presence of phosphorus pentoxide ($P_2O_5$) at temperatures in the general range of 50° to 100° and preferably 60° to 70° C. in an inert solvent such as dioxane, pyridine, or the like, whereby the hydroxyethyl group, being dehydrated, yields a vinyl group as substituent on the said position of the oxazolidinone ring. In an alternative procedure, the oxazolidinone not bearing a substituent upon the ring nitrogen atom may be reacted with an alkenyl alkyl ether in dimethyl formamide solvent and in the presence of mercuric acetate catalyst in a known trans-alkenylation reaction whereby to introduce an alkenyl substituent, as substituent upon the ring nitrogen of the oxazolidinone, oxazinidinone, or oxazepinanone ring.

The alkenyl-substituted materials are then polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis(isobutyronitrile), at a temperature in the range from 50° C. to 100° C. See also U.S. Patent 2,818,362. When it is desired to obtain the high molecular weight polymers the polymerization is carried out at a temperature in the lower portion of the polymerization temperature range and/or with a relatively smaller amount, for example, 0.01 to 0.1 weight percent of catalyst. When it is desired to obtain the various low molecular weight polymers, representing a very small number of monomeric moieties, the polymerization is carried out at a temperature in the upper portion of the polymerization temperature range, such as 80°–90° C., and/or in the presence of a relatively larger amount, for example 2 to 3 weight percent of a catalyst. As is known, polymer molecular weight is affected by the polymerization rate which in turn, is accelerated by higher values of temperature or of catalyst concentration, or both, and is decelerated by low values of these parameters. Upon completion of the polymerization, the components of the resulting mixture may if desired be separated according to molecular weight in known manners, such as azeotropic fractional distillation, centrifugation, solvent extraction and the like.

The present polymers and copolymers, in general, are stable under normal exposure to, for example, sunlight, air, and heat and other influences within a moderate temperature range near to living conditions of vegetable organisms.

The monomeric 3-, 4-, or 5-alkenyl cyclic carbamate compounds used as intermediates for the preparation of the present polymeric growth-delaying agents may be prepared by known methods wherein a (2-chloroalkyl)-2-oxazolidinone, oxazinidinone or oxazepinanone, or a suitable substituted (2-chloroethyl)-2-oxazolidinone, oxazinidinone or oxazepinanone is dehydrochlorinated with an alkaline material such as an alkali metal lower alkoxide. Similarly, other derivatives are prepared by suitable known general procedures starting with, for example, the (2-chloroethyl)-2-oxazolidinone, oxazinidinone or oxazepinanone.

The 3-(2-chloroalkyl)-oxazolidin-2-ones, oxazinidinones and oxazepinanones and substituted derivatives thereof are readily prepared by the reaction of a haloalkyl alkanolamine such as 2-hydroxyethyl-2-chloroethyl amine, and ethylene carbonate, whereby the N(2-chloroalkyl)-cyclic carbamate is formed, together with ethylene glycol as by-product of reaction. Substituents upon the hydroxyethyl moiety of the alkanolamine appear as substituent portions upon the group represented by E in the foregoing general formula; with the result that prepartion of the desired growth-inhibiting materials unsubstituted or with substituents in wide variety is readily carried out.

In practicing the present invention, the plant part the growth of which it is desired to delay or inhibit is brought into contact with the growth-inhibiting polymeric material. The manner in which such contact is effected is not critical. When the cyclic carbamate material is a solid (as is usually the case) such solid, in pure form, or mixed with or dispersed upon an inert finely-divided solid, or in combinaiton with another finely divided agricultural chemical substance, may be dusted upon the plant material of which the growth is to be inhibited or, especially in the case of seeds, the growth inhibiting material may be applied as a coating in the pelletizing of such seeds. Also, solutions or dispersions of the growth inhibiting material in inocuous liquid media may be employed as sprays, dips, washes, soil drenches and the like. Further, the plant reproductive or propagative parts may be coated with a slurry of one of the growth-inhibiting substances with the resulting deposit of a thin coating of the said inhibiting material which may, if desired, be dried. The incorporation in such slurries and consequently in such coatings of adhesives, binders, bodying agents, colorants, and other useful adjuvants as well as other substances of biological activity such as rodent repellants, fungicides, insecticides, fertilizers and the like is essentially without effect upon the practice of the present invention.

Whatever means are chosen to effect the necessary contact between the said polymeric growth-delaying substance and the plant or part of which the growth is to be delayed, it is believed to be essential that, in order to exhibit the growth-delaying effect according to the present invention, the said polymer must be dissolved, at least in part, in water. This apparently necessary dissolution in water takes place successfully when the plant part in superficially dry condition is dusted with the said polymer and thereafter is placed in contact with normal moist soil, whereby the said polymer dissolves, at least in part, in water present in the soil. The necessary dissolution in water also usually takes place when the dry polymer material comes in contact with natural plant juices such as sap. Water in its other and natural occurrences in any situation in which a dormant plant material would spontaneously be caused to resume active growth is generally sufficient to effect necessary dissolution of the present growth-delaying polymers. Thus, while a completely dry dust of such polymer upon dry seeds would have little or no growth-delaying effect, such effect would be irrelevant inasmuch as the dry condition itself would naturally inhibit the growth of seeds. When sufficient moisture is supplied to induce the growth of seeds, dormant plant stems, tubers, and the like, sufficient water is present also to effect necessary dissolution of the present polymer and consequent initiation of the growth-delaying effect of the present polymers.

The inhibition or delay of growth according to the present invention can be noted when employing a growth-delaying substance of the sort described dispersed in growth medium in a locality where it will contact the plant part of which the growth is to be inhibited, at very low concentrations. However, at concentrations as low as about 0.01 percent by weight of growth medium, the said growth delaying materials may have an effect upon some species of plant seeds or other plant materials which is of short duration and of very limited value in the arts of horticulture and agriculture. When employing the said growth-inhibiting substances at somewhat higher rates, the effects begin to be quite pronounced and at the concentration of approximately 0.5 percent by weight of growth medium, the said growth-inhibiting substances distinctly delay the germination of seeds or the growth of non-seed plant reproductive parts. When the present growth inhibiting substances are employed in concentrations of 10 percent by weight of growth medium or more, a saturation appears to be reached with the result that the employment of larger amounts does not prolong or intensify the growth-inhibiting action, or at least does not appreciably do so. Thus it will be apparent that no exact minimum or maximum amount to be employed can be stated as a critical limitation. However, for practical results, portions of the said materials equal to not less than about 0.01 percent by weight of growth medium should be used.

The growth-inhibiting action of the said carbamate substances appears to be transitory for reasons which are not known. As a rule, after a period of time the duration of which varies according to factors, some of which are unknown, the plant materials of which the growth has been delayed or inhibited appear in some way to throw off the inhibiting action or reestablish some kind of normalcy with the result that they again grow, perhaps slower, with no evident serious inhibition or injury. Some relationship appears to exist between, on the one hand, the relative concentration in growth medium of the growth-inhibiting substance, and, on the other hand, the duration of inhibiting action. However, no rigid relationship is now known to exist, upon the basis of which the duration or degree of inhibition can exactly be predicted.

In a field as diverse as the various horticultural, agricultural, gardening, and vegetation-control fields, the present invention finds a great many practical embodiments and applications. The following examples are illustrative only, and are not to be construed as limiting the present invention.

*Example 1*

Into each of three 400 milliliter glass beakers was placed a pad of purified cellulose tissue. On this tissue in each beaker were placed 10 apparently sound white navy beans (*Phaseolus vulgaris* var. "Michelite"). In one beaker the beans and the cellulose pad were moistened with 15 milliliters 10 weight percent solution of polymeric 3-vinyloxazolidin-2-one the average molecular weight of which corresponded to a K-value of Fikentscher of 17.5 (see Cellulosechemie 13, 60 (1932)). The beans and the cellulose pad in another were moistened with 15 milliliters 10 weight percent solution polymeric 5-methyl-3-vinyloxazolidin-2-one having a Fikentscher K-value of 20. The beans and cellulose pad in a third beaker were moistened with 15 milliliters water. The beakers were then covered with watch glasses and labeled and placed in a dark cupboard and examined daily and the incidence of germination noted.

No germination was observed on either the day of the treatment or the first day following treatment. On the second day following treatment, two beans of the untreated check germinated but no treated beans germinated. On the third day following treatment, a total of 8 beans in the untreated check had germinated, but none of the treated beans had germinated. By the fifth day following treatment, all of the untreated beans had germinated whereas one bean had germinated in the beaker treated with polymeric 5-methyl-3-vinyloxazolidin-2-one and none of the beans had germinated in the beaker treated with polymeric vinyloxazolidin-2-one. By the sixth day following treatment, a total of six beans had germinated in the beaker treated with polymeric 5-methyl-3-vinyloxazolidin-2-one and none had germinated in the beaker treated with polymeric vinyloxazolidin-2-one. No further germinations were observed until the thirteenth day following treatment by which time one bean in the beaker treated with polymeric-5-vinyloxazolidin-2-one germinated. At this point the course of the experiment was changed. In the untreated check, seven beans were growing vigorously and the other three were alive and evidenced sufficient vigor to be regarded as normal. In contrast, while there was no evidence of mortality, one seed had germinated in the beaker in which the seed was treated with polymeric vinyloxazolidin-2-one and a total of six seeds germinated in the beaker treated with polymeric 5-methyl-3-vinyloxazolidin-2-one. The growth of the beans treated with the polymeric cyclic carbamate materials while not visibly abnormal, was unusually slow.

At this time in the experiment, the beans treated with polymeric 3-vinyloxazolidin-2-one were removed from the said beaker and washed with distilled water and placed in a beaker containing a purified cellulose pad moistened with fresh water. The beans were then covered again with a watch glass and returned to a dark cupboard and observed daily. After three days more, corresponding to the seventeenth day following treatment, a total of six of the beans whose germination was originally delayed by treatment with polymeric 3-vinyloxazolidin-2-one had germinated and begun to grow apparently normally. Upon examination the bean seedlings appeared normal for seedlings produced in the absence of light.

*Example 2*

Seeds of 11 different species of plants representative of the classes of Monocotyledoneae and Dicotyledoneae, in the families of the Gramineae, the Compositae and the Leguminosae were studied for possible effect upon their germination and growth by polymeric 3-vinyloxazolidin-2-one. These families were chosen because of their general economic importance. In each test, a known number of seeds was placed in a six inch glass test tube in the bottom of which had been placed a purified cellulose absorbent material and 5 milliliters of a 10 percent aqueous solution of polymeric 3-vinyloxazolidin-2-one. The absorbent material was disposed in such way as to hold the seeds above the level of the liquid so that they were moistened by contact with the said solution but not immersed therein. Similar tubes containing similar absorbent pads and seeds of each of the said species were prepared, differing only in that the added liquid was fresh water containing no test material.

The tubes thus prepared were placed in a dark cupboard for a period of time to allow germination to occur.

Distilled water was added as needed to maintain the level of liquid in each tube at about the original level.

During the period of growth or attempted growth, each tube was carefully inspected once every day and notation made of the percentage of germination and the rate of growth of seedlings. The test was continued for six days, by which time all the untreated check seeds had shown a high percentage of germination, normal for each species tested. In contrast, the seeds growing in aqueous oxazolidinone medium all showed inhibition of various degrees. Specifically, there was complete inhibition and total absence of evidence of germination in the seeds of perennial rye grass, red fescue grass, timothy (*Phleum pratense*), soft white wheat, barley, rye, oats, sunflower, and beans (*Phaseolus vulgaris*, var. Michelite). Seeds of alfalfa and sweet clover germinated rather uniformly but did not grow. Specifically, alfalfa and clover seed burst their seed coats, displaying stem, cotyledon, hypocotyl and radicle; but the said parts did not grow appreciably larger than they had been in the seed.

Spontaneous inoculation of all the test tubes with viable spores of various parasitic microfungi was assumed to have taken place. The cellulose pad, and parts of the plant materials including shed seed coats in the test tubes used as untreated check showed mold by the end of the test. In contrast, the cellulose pads and shed seed parts in the test tubes treated with polymeric 3-vinyloxazolidin-2-one gave no evidence of growth of any fungal organism. Some inhibiting action was thus determined to extend also to fungi.

*Example 3*

The present example was carried out in all particulars as was the foregoing example except that the treated seeds were treated by the addition, to the absorbent pad in the test tubes in which they were grown, of 5 milliliters of a 10 weight percent aqueous percent aqueous solution of a different growth-inhibiting substance, polymeric 5-methyl-3-vinyloxazolidin-2-one. At the end of the test period, it was ascertained that there had been complete inhibition and no evidence of germination of perennial rye grass, red fescue grass, and timothy. In contrast, there was germination but little or no growth in the instance of Michigan wheat, barley, oats, sunflowers, beans, alfalfa, and sweet clover. None of the seeds appeared dead. Again, the check specimens showed evidence of abundant growth of microfungi whereas the treated tubes showed no evidence of such infestation.

*Example 4*

In each of two battery jars was placed a pad of purified absorbent cellulose. To one jar was added 5 milliliters of a 10 weight percent aqueous solution of polymeric 3-vinyloxazolidin-2-one having a K-value according to Fikentscher of 19 and correspondingly, into the other was placed 5 milliliters of fresh water. Into each jar were then put 4 moderate-sized whole white potatoes (*Solanum tuberosum*) having an average diameter of approximately 1½ inches. The jars were thereafter covered and placed in a dark cupboard for a period of time to ascertain what growth would occur. No growth of eyes (buds) of the potato tubers occurred on the day of treatment. However, on the next day, two of the untreated potatoes showed expansion and incipient growth of 1 or more buds whereas none of the potatoes in the jar to which the oxazolidinone solution had been added showed any growth. By the second day following treatment, three of the untreated potatoes showed growth whereas very slight lind expansion was noted in one of the untreated potatoes. On the fourth and all succeeding days of the test, all of the untreated potatoes showed evidence of vigorous healthy growth, natural except for the chlorosis resulting from the absence of light. In contrast, very weak growth was noted on only two of the potatoes in the jar to which the oxazolidinone had been added.

*Example 5*

In procedures essentially the same as the foregoing, a comparison was made between potatoes growing in a battery jar on top of a cellulose pad which was thoroughly moistened by the addition thereto of 5 milliliters of 10 weight percent aqueous solution of polymeric 5-methyl-3-vinyloxazolidin-2-one and an untreated check wherein the pad was moistened with fresh water only. By the end of the third day, three of the untreated potatoes showed vigorous growth whereas none of the potatoes in the jar containing the oxazolidinone solution showed expansion and growth of any bud.

*Example 6*

Studies were carried out to ascertain the effect, if any, of concentration of cyclic carbamate growth-inhibiting substance upon the growth-inhibiting effect evident upon seedling plants grown from treated seeds and in medium containing such inhibiting material. Because the results as initially ascertained were surprising and appeared to contain certain anomalies, the test was substantially replicated many times and with numerous concentrations of cyclic carbamate material over the range from 100 parts by weight per million parts by weight of water to 100,000 parts by weight per million parts of water. The data obtained in such replicate tests were averaged and it was determined that the resulting averages did not differ significantly from the results of individual tests.

In carrying out the tests of the present example, the employed seed was of navy bean, inasmuch as it had been determined previously that responses of seeds of this plant were not distinctively different from responses of a great many unrelated kinds of plants and the relatively larger size of the seed and of the resulting parts of the seedling plant made observation and accurate measurement easier to carry out.

A series of quart bottles approximately 7½ inches high and having a top opening of approximately 2⅜ inches ("Mason jars") was provided, in the bottom of each of which was an absorbent pad of purified cellulose. One series of jars was reserved for a check into which as growth medium was placed only fresh water. Another series of jars was used to test concentration effects upon the growth inhibiting substance polymeric 3-vinyloxazolidin-2-one and yet another series of jars was used to test the growth inhibiting substance polymeric 5-methyl-3-vinyloxazolidin-2-one. Into each jar was placed 15 milliliters of liquid representing (in the case of the check jars)

water or one of the growth inhibiting materials at various concentrations over the range hereinbefore indicated. Into each jar were then placed 10 navy beans. The cellulose pads employed were of approximately 2 inches depth, and of sufficient bulk that although the beans were in contact with a moist surface they were never immersed in the liquid. The bottles were then snugly closed and placed in a dark cupboard at room temperature for 5 days and thereafter removed and maintained for 5 days in light.

Initial range-finding studies had ascertained that by the end of the tenth day following the beginning of the test, the untreated check bean plants would have grown to the height of the interior of the employed jar. Therefore, readings were taken on the tenth day by which time the measurement of these check plants was still valid. Within each individual jar, the relative humidity was near to or at 100 percent throughout the period of growth.

The growth of the check plants was accepted as a norm under the stated conditions. A typical average height for such plants (excluding measurements from non-viable seeds and other anomalous results) was 5 inches. Growth of the oxazolidinone treated seeds is evaluated by comparison with this average.

The seeds grown in contact with 10 percent (100,000 p.p.m.) aqueous solution of either growth-inhibiting material evidenced almost no growth. In no case had any plant arising from these seeds reached a height of ½ inch, although the seeds treated with the methyl-substituted oxazolidinone material showed slightly greater growth than did those treated with the polymeric 3-vinyloxazolidin-2-one.

In the jars in which 5 weight percent aqueous solution of growth-inhibiting material had been employed, somewhat greater growth occurred in the presence of the methyl-substituted material, typical plants achieving a height of ½ inch. The unsubstituted vinyloxazolidinone polymer continued to cause complete inhibition.

In the jars in which 1 weight percent of growth-inhibiting material (10,000 p.p.m.) was employed somewhat more extensive growth occurred. Beans in contact with the 5-methyl-substituted oxazolidinone material showed a growth of 3 inches whereas those in contact with the unsubstituted material showed a growth of a little less than ½ inch.

When the concentration of the growth-inhibiting material was further reduced to ½ percent (5,000 parts per million) the beans contacted with polymeric 5-methyl-3-vinyloxazolidin-2-one solution grew to a stature approximately equivalent to the stature of the untreated checks, that is to say about 5 inches, whereas the beans contacted with aqueous polymeric 3-vinyloxazolidin-2-one grew to approximately 3 inches height.

The growth resulting when beans were grown in contact with solutions of lower concentrations than these proved to be quite surprising. When the concentration of the growth-inhibiting substances was 1/10 of one percent, the plants were inhibited to a much greater extent than when the higher concentration of ½ percent was employed. Thus, the plants grown in contact with the methyl-substituted inhibiting material in the concentration of 0.1 percent (1,000 p.p.m.) reached a stature of only 3 inches, no higher than when in contact with 1 percent solution and substantially less than when in contact with ½ percent solution. Likewise, the beans grown in contact with polymeric 3-vinyloxazolidin-2-one achieved a stature of approximately 1 inch, only ⅓ the stature achieved in contact with solutions 5 times as concentrated.

Decreasing the concentration in water of the growth-inhibiting substance still further increased the inhibiting action of the methyl-substituted material. At 0.05 percent concentration, the said methyl-substituted polymer caused inhibition of growth almost as great as that caused at a concentration of 5 percent. The stature of the plants grown under the said conditions was approximately 1 inch. In contrast, the unsubstituted 3-vinyloxazolidin-2-one polymer at 0.05 percent was somewhat less effective than at 0.1 percent. As concentrations lower than 0.05 percent were tested for growth-inhibiting action, the said growth-inhibiting effect decreased as the cyclic carbamate material was decreased to concentrations of 0.01 percent in the case of the unsubstituted material and to 0.005 percent in the case of the methyl-substituted material at which concentrations the treated plants would have achieved nearly the stature of the untreated checks.

At concentrations yet lower than the indicated concentrations, the growth of the bean plants grown from treated seed did not differ to a statistically significant extent from the growth of the untreated checks.

Thus it is evident that the relationship between concentration of growth-inhibiting cyclic carbamate material and resulting growth-inhibiting effect is not a direct rectilinear or curvilinear relationship but it marked by irregularities and anomalies. It is noted, however, that in concentrations as low as 0.03 percent by weight of growth medium, the said polymeric 3-vinyloxazolidin-2-one exhibited a clear inhibiting effect. The polymeric 5-methyl-3-vinyloxazolidin-2-one had a similar effect over a similar range of concentrations except for a peak in the neighborhood of 0.5 percent by weight of water at which concentrations the said material was relatively less effective.

*Example 7*

An experiment is carried out to ascertain the utility of the present invention under agricultural conditions. It is desired to retard the germination of bean seeds but not to affect injuriously their subsequent growth. The retardation allows an interval between planting and emergence thruogh the soil somewhat longer than usual during which time germinant seeds and young seedlings of weeds have opportunity to emerge and are killed by application of an aqueous dispersion of dinitro-ortho-secondary-butylphenol as a pre-emergence or early post-emergence herbicidal spray.

The bean seeds are enrobed in a coating comprising talc as principal inert bodying material, a small amount of aqueous methyl cellulose as binding agent, and, as growth retarding substance, two percent by weight of coating substance of polymeric 3-vinyloxazolidin-2-one. The resulting pelleted seeds are coated to a radial depth of approximately 1/16 inch.

The seeds are planted with mechanical equipment, the apparatus being adapted to accommodate the increased size of the pelleted seed.

The resulting coated seed is employed to plant the greater part of a 10-acre field of light, sandy soil. For comparison, 10 rows near one edge of the field are planted to untreated bean seeds. The planting is carried out in early June under normal conditions of commercial dry bean production.

The untreated bean seeds emerge through the soil normally approximately 1 week after planting. By this time, the field is thickly grown with very young seedling weeds including Amaranthus, Portulaca, Chenopodium, Digitaria and the like. At this stage of the growth, the entire field is sprayed in accepted agricultural procedure with an aqueous dispersion of a commercial pre-emergence and early post-emergence herbicide comprising the lower alkanolamine salts of mixed dinitro-ortho-secondary-butyl phenols at an effective herbicidal rate. A uniform general kill of the seedling weeds together with the emerged bean seedlings is evident by the third day following application of the said herbicidal spray.

At various intervals from 5 to 12 days later the treated bean seeds emerge; following emergence they grow normally, and the field has a low incidence of early season weeds.

*Example 8*

Apple twigs, most of which are of the growth of the previous two years, are cut from dormant apple trees of the Mother variety in February and placed in storage to be used in June as scions in the production of further trees of the said variety.

The twigs are segregated at random into three groups of approximately equal numbers. One of the groups, as a check, is placed in moist sawdust and refrigerated at approximately 35° F. and held under these conditions for subsequent use. The second and third groups of twigs are treated according to the process of the present invention by wetting them thoroughly with water and then dusting them heavily with finely-divided polymeric 5-methyl-3-vinyl-oxazolidinone. A heavy deposit of the polymeric substance adheres to and generally coats the surfaces of the moist twigs. These groups of twigs are thereafter buried in moist sawdust and subsequently stored at approximately 35° F. for subsequent use.

During the first week in May the twigs are removed and inspected. The untreated check group shows the development of callus tissue from the cut ends of the cambial tissue. Approximately 5 percent of the buds on the said twigs have produced chlorotic new growth. In the groups of twigs treated according to the present invention the production of callus tissue is much smaller and on many twigs cannot be discerened. None of the twigs has produced any new growth.

One of the two treated groups of twigs is then thoroughly washed in fresh water to remove the polymeric material. All groups of twigs are then returned to moist sawdust, new moist sawdust free from the polymeric material being used to cover the washed group of twigs. The twigs are again maintained at approximately 35° F. until the second week in June at which time all are again examined. On the untreated check group of twigs the new growth has elongated further and numerous buds which were apparently dormant at the time of the examination in May have put forth new growth. Less than half of the original scion wood is deemed to be in condition suitable to be used in insititious propagation of apple trees of the same variety.

On the group of twigs treated with the polymeric 5-methyl-3-vinyloxazolidinone but washed free thereof at the time of the previous inspection, a number of buds have begun to produce new growth, and callus tissue generally has developed at the cut ends of the cambial tissues. The twigs of which treatment according to the present invention has been maintained continuously are entirely dormant and show very little callus tissue. The twigs appear plump, turgid; and examination of the subcutaneous cambium layer finds it to be of a bright green color. The said twigs are determined to be in excellent condition for use in the insititious propagation of apple trees of the said variety.

The growth-inhibiting action of the present invention may be employed in various ways to the advantage in the art of agriculture, horticulture and the like. Nursery stock dug during clement autumn weather and retained in moist cold storage throughout winter may be timely treated in manners according to the present invention whereby undesired pre-season growth of such stock is postponed but the plants remain uninjured. Root crops to be stored for human use are surface-treated to prevent untimely sprouting with corollary hydrolysis of starches to sugars and general deterioration. In either of the foregoing uses, the growth-retarding action is terminated by washing the plant materials to remove growth-retarding substance.

The germination and growth of weed seeds in soil may be delayed, and desired crops growing from seeds planted at depths greater than the depth reached in the treatment may be favored. Numerous other applications of the present invention will suggest themselves to those skilled in the arts of agriculture and horticulture.

The growth-inhibiting agent according to the present invention may be applied in the seed furrow as a dust or other particulate matter wherein the active growth-inhibiting cyclic carbamate material may, if desired, be mixed with a solid diluent or carrier or may be applied in unmodified form. Also, the cyclic carbamate growth-inhibiting substances may be employed in solution or aqueous dispersion applied to the soil in sufficient quantities and in sufficient liquid medium to provide the desired growth-inhibiting action to the desired depth within the soil. Also, the soil surface applications may be plowed, disked, and in other ways worked into the top soil to any desired depth, thereby exhibiting the desired growth-inhibiting action to such depth. Whatever means be adopted to apply the growth-inhibiting agents of the present invention, it is essential and critical that a growth-inhibiting or growth-delaying amount of the said material be brought into direct contact with the seed, root, tuber, corm, bulb, rhizome, or the like, the growth of which is to be inhibited or delayed.

The number and kind of specific embodiments of the present invention which have hereinbefore been set forth are not to be construed as limiting the scope hereof, such scope being limited only according to the following claims.

We claim:

1. The method of delaying the growth of a viable plant part which includes the step of contacting the said part with a growth-inhibiting amount of a water soluble homopolymeric material having as sole and regularly recurring substituents upon a polyolefinic structure a member of the group consisting of substituted cyclic carbamate moieties each containing 5, 6 and 7 annular atoms, any substituent upon the non-carbonyl annular carbon atoms of which is selected from lower alkyl and hydroxy lower alkyl, wherein the expression lower alkyl designates an alkyl group being of 1–6, inclusive carbon atoms.

2. The method of delaying the germination of seed which includes the step of contacting the seed with a growth-inhibiting amount of a water soluble homopolymeric alkenyl substituted oxazolidinone (any substituent being upon the non-carbonyl annular carbon atoms of the oxazolidinone nucleus and being selected from lower alkyl and hydroxy lower alkyl.

3. The method of inhibiting the growth of a plant part which includes the step of contacting the said part with a growth-inhibiting amount of polymeric 3-vinyloxazolidin-2-one.

4. The method of delaying the growth of a plant part which includes the step of contacting the said part with a growth-inhibiting amount of polymeric 5-methyl-3-vinyl-oxazolidin-2-one.

References Cited in the file of this patent

UNITED STATES PATENTS

| | | |
|---|---|---|
| 2,844,590 | Cameron | July 22, 1958 |
| 2,987,505 | Werner | June 6, 1961 |